United States Patent
Savit

[15] 3,693,400
[45] Sept. 26, 1972

[54] METHOD FOR MEASURING THE CHARACTERISTICS OF MECHANICAL-TO-ELECTRICAL TRANSDUCERS

[72] Inventor: Carl H. Savit, Houston, Tex.
[73] Assignee: Western Geophysical Company of America, Houston, Tex.
[22] Filed: May 20, 1970
[21] Appl. No.: 39,114

[52] U.S. Cl. ................................73/1 DV, 73/432 L
[51] Int. Cl. ...........................................G04r 29/00
[58] Field of Search..........73/4 DV, 432 L, 382, 61.3

[56] References Cited

UNITED STATES PATENTS

| | | |
|---|---|---|
| 3,456,484 | 7/1969 | Schwartz....................73/1 DV |
| 3,435,656 | 4/1969 | Jordan et al. .............73/1 DV |
| 3,429,184 | 2/1969 | Russell .......................73/382 |
| 3,164,995 | 1/1965 | Federn et al.................73/462 |

Primary Examiner—S. Clement Swisher
Attorney—Michael P. Breston, Alan C. Rose, Walter R. Thiel and Alfred B. Levine

[57] ABSTRACT

A transducer to be tested is mounted on a shaking table which is energized by a desired driving test signal. The table's motion is precisely measured with reference to an inertial system, for example, a freely falling body. The precise measurement of the shaking table's movements is correlated with the electric output signal from the transducer, and the result of this correlation allows an accurate measurement of the characteristics of the transducer subjected to vibrations by the shaking table.

14 Claims, 3 Drawing Figures

INVENTOR.
CARL H. SAVIT,
BY
MICHAEL P. BRESTON,
ATTORNEY.

INVENTOR.
CARL H. SAVIT,
BY
MICHAEL P. BRESTON,
ATTORNEY.

METHOD FOR MEASURING THE CHARACTERISTICS OF MECHANICAL-TO-ELECTRICAL TRANSDUCERS

BACKGROUND OF THE INVENTION

In the testing of mechanical-to-electrical transducers such as accelerometers, geophones, seismometers, etc., it is customary to place the transducer to be tested upon a vibrating device known as a shaking table. The shaking table is driven by a vibrator which is energized by an electric signal whose characteristics are predetermined. For the test results to be highly accurate, it is necessary to build the shaking table in a manner as to produce mechanical vibrations which follow with great fidelity the waveform of the driving electric signal. Such a high-fidelity shaking table is very costly and extremely difficult to manufacture.

Another basic difficulty encountered in using prior art transducer testing methods arises from the need to completely isolate the shaking table from extraneous vibrations such as result from background motions in the earth itself, from man-produced noise, and from the effects of local natural phenomena such as surf, wind, etc.

Since the transducer cannot distinguish between the driving motion actually imparted to the shaking table and the total background motion, the electrical output signal of the transducer includes an appreciable proportion of noise.

In the use of prior art transducer testing techniques, the difficulties encountered limit the accuracy with which the transducer's response, that is, the relationship of its output electrical signal to the input mechanical signal, can be measured. Transducer design is thus limited at best to the precision of the means to determine the characteristics of the transducer. Finally, systems employing such transducers in turn become subjected to the accuracy limitations imposed by the transducers and hence on the limitations of the transducer testing means.

SUMMARY OF THE INVENTION

In accordance with this invention, the need for an accurate and costly shaking table is eliminated. A simple or even a crude shaking table can be employed, and yet precise measurements of transducer characteristics can be achieved. In fact, the shaking table can be any platform and even the earth or the floor of a building. The invention contemplates mounting the transducer to be tested on such a shaking table in conventional manner. The motion of the shaking table is then precisely measured with reference to an inertial system. By correlating the measurement of the motion of the shaking table with the output electrical signal from the transducer, the transducer's characteristics can be precisely measured either graphically by hand, or by a computer either analog or digital.

Several specific embodiments of the invention are possible. In one embodiment, two distances are measured simultaneously: one distance between a measuring device and the moving table, and the other distance between the device and a free-falling mass. Again, a suitable correlation between the two measured distances will provide the absolute measurement of the vibrations of the shaking table.

In another embodiment a distance-measuring device may constitute the falling mass in a vacuum tube positioned above the shaking table to directly measure the distance between the free-falling device and the shaking table as a function of time. The absolute motion of the shaking table can be then obtained from the thusly measured distance between the falling mass and the shaking table corrected for the known motion of a freely falling mass.

BRIEF DESCRIPTION OF THE DRAWINGS

Referring now to FIG. 1, there is shown a commercially available shaking table 10 which can be a relatively crude device compared to the now employed elaborate and costly shaking tables. Table 10 is being shaken by a vibrator 12 energized from an electric energy source 14. Source 14 produces a desired electric test waveform in conventional manner. Table 10 and vibrator 12 are mounted on a ground or floor 16 which, as previously mentioned, is subject to natural and man-made background vibrations or waves represented by arrows 18.

Figure 1:
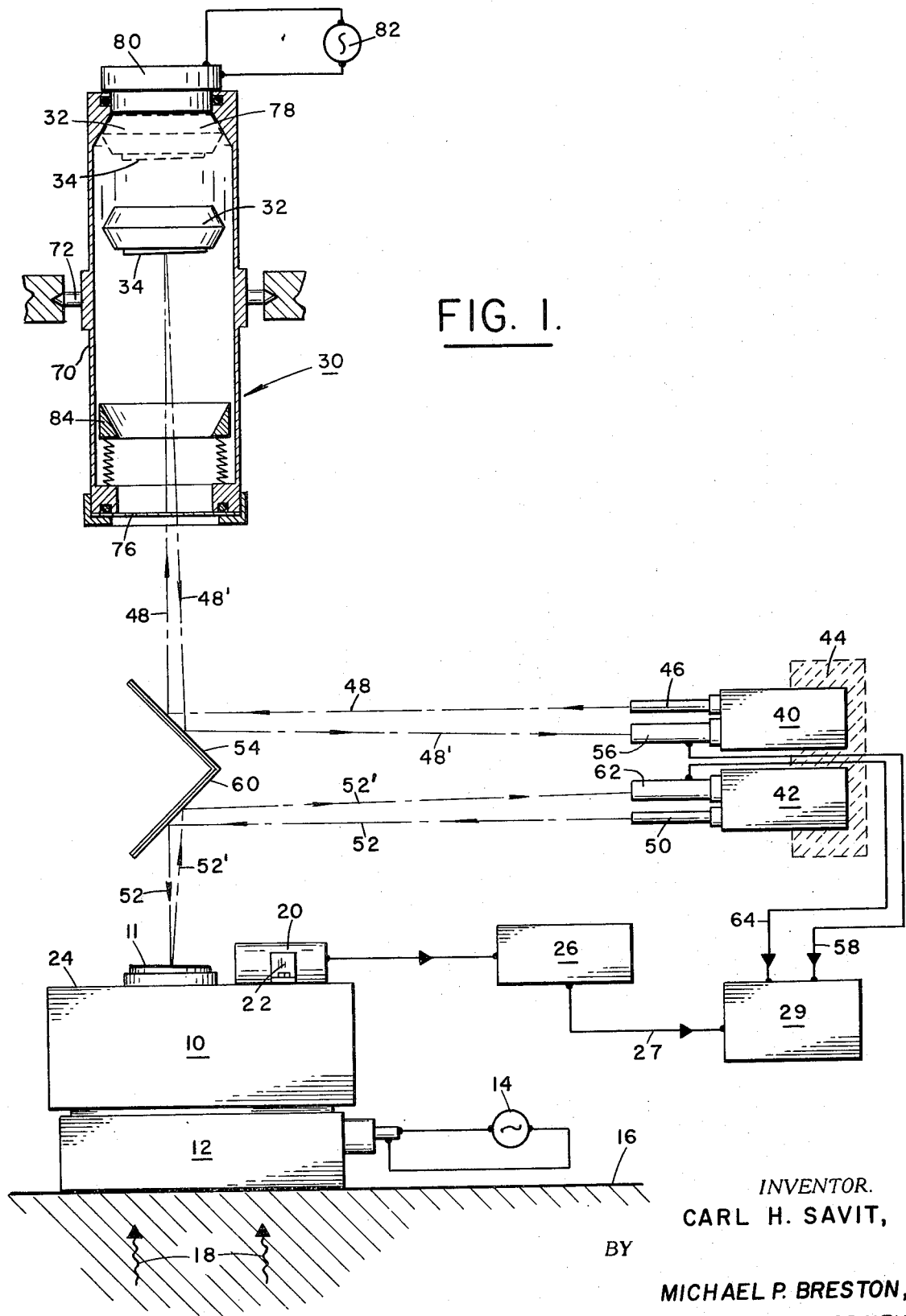
FIG. 1 schematically illustrates one embodiment of the invention using two distance-measuring devices.

A mechanical-to-electrical transducer to be tested, generally designated as 20, is conventionally mounted by a clamp 22 on the top surface 24 of table 10. In response to the vibration of table 10, transducer 20 will generate a corresponding output electric signal which is recorded by recorder 26.

In accordance with the present invention, the precise measurement of the mechanical motion of table 10 is accomplished by measuring the distance of table 10 with reference to an inertial system, generally designated as 30, such as is readily provided by a free-falling mass 32 to which is secured a reflecting mirror 34. Conventional optical distance measuring techniques can be employed.

Lasers are preferred although ordinary light sources could be employed as well. Unlike the waves emitted by an ordinary light source, such as an electric lamp, a laser produces a light beam that does not diffuse. Moreover, a laser organizes the energy waves emitted by a stimulated atom so that they travel in the same direction, at the same frequency, and perfectly in step with the stimulating radiation. The laser therefore generates coherent light waves having a narrow band of frequency similar to that of a radio oscillator, but in the infra-red and visible-light portions of the spectrum. Coherent sources, utilizing the laser principle, now exist at many frequencies in both the visible and infra-red regions. Such laser distance-measuring devices find application, for example, in range finding and in radar tracking.

In the embodiment shown in FIG. 1, two laser distance-measuring devices 40 and 42 are employed. Devices 40 and 42 can be mounted on a common support platform 44. Device 40 includes an emitter 46 for emitting an incident beam 48. Similarly device 42 includes an emitter 50 for emitting an incident beam 52.

Beam 48 is reflected by a reflecting mirror 54 onto mirror 34 which produces a reflected beam 48' from the free-falling mass 32. Reflected beam 48' is detected by a detector 56 whose output is an electric signal provided to line 58. The amplitude of this signal as a function of time corresponds to the distance, as a function of time, between the falling mass 32 and laser 40.

In a similar fashion incident light beam 52 is reflected by mirror 60 and a mirror 11 to produce a reflected light beam 52' which is detected by a detector 62. The output electric signal from detector 62 is provided to line 64. The amplitude of the signal on line 64 similarly allows a determination of the distance from table 10 to laser 42 and, hence, of the motion of table 10 as a function of time. Since the two laser devices 40 and 42 are mounted on a common frame 44, the sum of the distances measured by detectors 56 and 62 will be equal to the distance between mirror 34 and mirror 11 plus a constant which will be independent of the motion of lasers 40 and 42 relative to ground 16.

The measurement of the motion of the shaking table 10 with reference to the inertial system 30 can be deduced from the measured distance between the shaking table and laser 42, corrected for the measured motion of the free falling mass 32. The vertical distance between the mirror 34 on the inertial mass 32 and the reference or median position of the mirror 11 on the shaking table 10 is denoted $y$.

As is well known from elementary physics, $d^2y/dt^2 = -g$, where $t$ is time measured from the time of release of the inertial mass 32, and $g$ is the local value of the acceleration of gravity. The distance $y$ for a stationary table 10 is thus given by $y = y_o - \frac{1}{2}gt^2$, where $y_o$ is the value of $y$ when the inertial mass 32 is in its initial position, i.e., when $t = 0$.

If now the shaking table 10 oscillated in a vertical direction about its median position, and its position as a function of time is designated $z(t)$, the total distance between mirrors 34 and 11 will be $[y - z(t)]$ and the sum of the distances measured by the lasers 40 and 42 will be $w(t) = y - z(t) + k$, where $k$ is a constant. Thus, $$z(t) = y - w(t) + k$$
$$= y_o + k - \tfrac{1}{2}gt^2 - w(t).$$

Since $w(t)$ is the quantity measured by the two distance measuring devices 40 and 42, and $g$ can be determined to a high degree of precision, the motion $z(t)$ of the shaking table 10 is precisely determinable up to an additive constant $(y_o + k)$.

For the purposes of measuring the response of a transducer 20, it is only necessary to know the motion of the transducer up to an additive constant. Thus by means of the present invention, the response of a transducer to a known mechanical input may be very precisely determined.

For greater precision, especially if the drop distance of the inertial mass 32 is relatively great, the acceleration of gravity $g$ may be considered as a variable by using the equation $$\frac{d^2y}{dt^2} = g_0 \left(\frac{R}{R+y}\right)^2$$

where $g_o$ and $R$ are, respectively, the acceleration of gravity and the distance to the center of the earth at the median position of the mirror 11.

It is to be noted that a drop distance of 4 feet will afford one-half second of free-fall time, while a distance of 16 feet will afford one second of observation time. These times are adequate to measure transducer responses to frequencies as low as 2 or 1 Hz.

The electrical output signal from transducer 20, as recorded by recorder 26, is the electrical response of the transducer to the mechanical motion of the shaking table. The characteristics of transducer 20 can then be obtained in the form of a frequency response or of an impulse response by mathematical computations well known in the art. The electrical output of recorder 26 is fed via a line 27 to a computer 29 which also receives via lines 58 and 64 the output signals from detectors 56 and 62, respectively. Computer 29 will perform the necessary mathematical computations. Computer 29 may be any type well known to the art, either digital or analog. In a preferred embodiment a digital computer such as IBM 360–40 could be used. For use with a digital computer, output from detectors 56 and 62 should preferably be in digital form for direct input of the data to computer 29.

Recorder 26 is conveniently a magnetic tape recorder of any type well known to the art. In one embodiment, electrical signals from transducer 20 are digitized and recorded on magnatic tape as binary digits. Output from the tape is then sent directly to computer 29 where the transducer response is mathematically compared with shaking-table motion.

Information generated by the computer may, for example, be arranged conveniently as a table listing per cent of peak transducer output versus the driving frequency.

To make the inertial system 30 completely isolated from external effects, particularly air resistance, there is provided an evacuated tube 70 which is pivotally supported by pivot means 72. The bottom end of tube 70 is provided with a transparent glass wall 76. To release the mass 32 from its upper rest position 78, there may be provided a magnetic latch mechanism 80 which is controlled by an electric signal supplied by a source 82. A suitable catching mechanism 84 catches the falling mass 32 near the bottom of tube 70. After the free fall, to return mass 32 to its initial position 78, tube 70 is pivoted about pivot 72 by automatic means (not shown). Other mass-return means could be provided if desired. For example, a movable solenoid coil around tube 70 could lift mass 32 to its initial position 78. Alternatively, the vacuum tube 70 can be dispensed with and the entire apparatus can be enclosed within a vacuum chamber.

Figure 2:
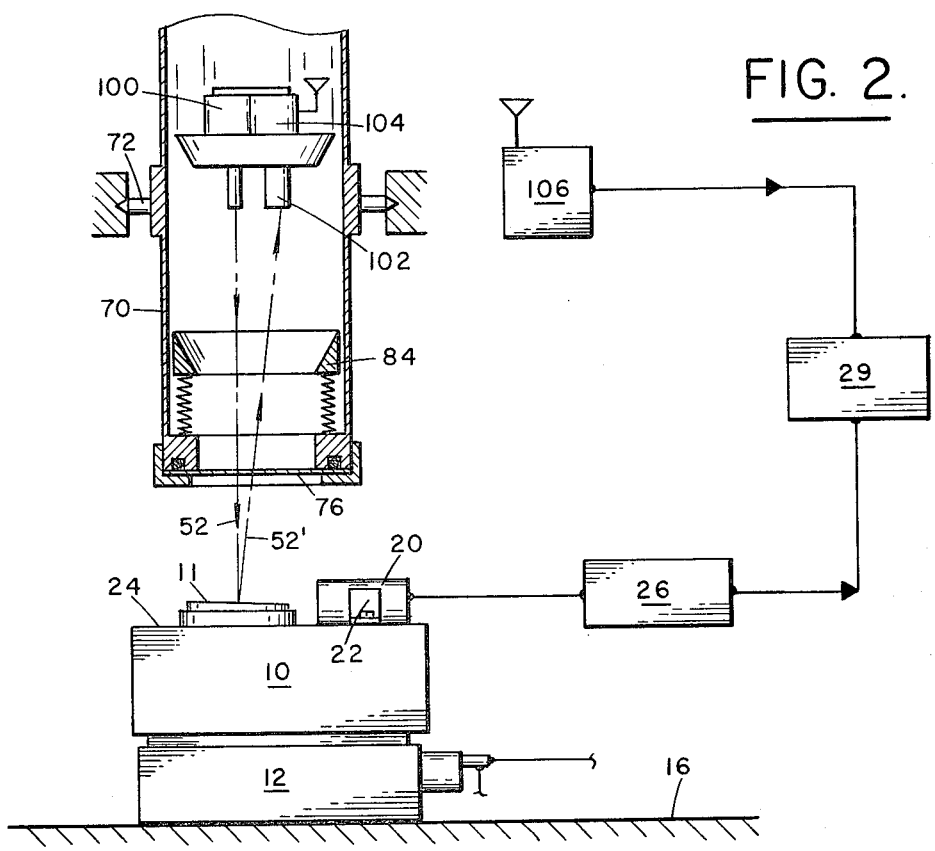
FIG. 2 schematically illustrates another embodiment of the invention using one distance-measuring device.

Referring now to FIG. 2, wherein the same numerals designate similar parts, a laser device 100 is substituted for the mass 32. The distance between laser 100 and the shaking table 10 is continuously measured by a detector 102 attached to or forming part of laser 100. The output of detector 102 is transmitted by a radio transmitter 104 to a fixed radio receiver 106, thereby avoiding the use of physical attachments between the free-falling laser 100 and ground 16.

Figure 3:
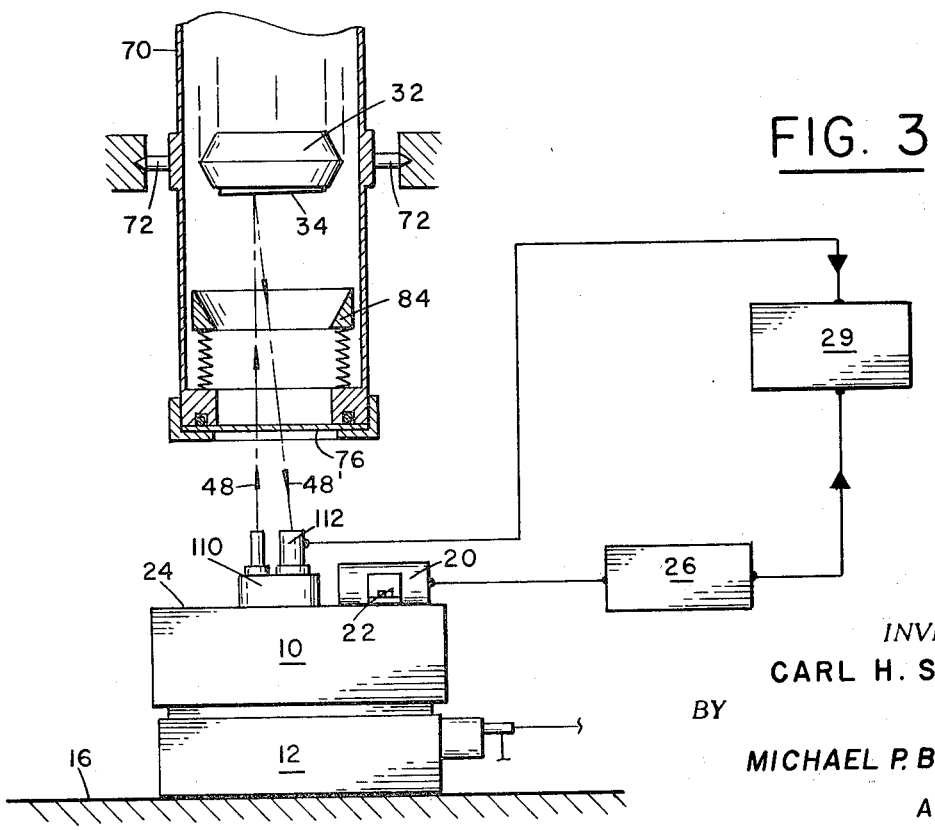
FIG. 3 is a variation of the embodiment shown in FIG. 2.

In the embodiment shown in FIG. 3, which is similar to the embodiment of FIG. 2, a laser 110 is substituted for mirror 11. The reflected light beam is detected by a detector 112 which provides a continual record of the distance between laser 110 and mirror 34.

In FIGS. 2 and 3, the absolute motion of shaking table 10 can be deduced from the measured distance between shaking table 10 and the free-falling mass, corrected for the precisely known motion of the free-falling mass as hereinabove described.

The output signal from either radio 106 or detector 112 is again fed to computer 29 for obtaining the desired precise measurement of the mechanical-to-electrical characteristics of transducer 20.

By providing in all embodiments rapid means of returning the falling mass, and by using two or more vacuum tubes, continuous measurements can be made by switching between tubes so as always to record with respect to at least one falling mass. Mirror 11 should be mounted as closely as possible to transducer 20 or even on top of transducer 20. Other arrangements of lasers, mirrors, and shaking tables are possible and will readily suggest themselves to those familiar with optical distance-measuring techniques.

In practice, as will be appreciated by those skilled in the art, interferometers, or the like, are preferred for the accurate measurement of distances. The essential feature of interferometers using laser beams is that coherent beams which have travelled over different paths are combined together to form interference fringes. The establishment of such fringes allows very small variations in distance to be measured with great accuracy.

While in FIGS. 1 through 3 the incident and reflected beams have been shown, for the sake of clarity of exposition, to be separate and distinct, and the reflecting mirros 11 and 34 as being inclined relative to the horizontal, in practice the incident and reflected beams are combined and the reflecting mirrors are horizontal.

Accordingly, the reflected beams 48' and 52' will retrace the paths of the incident beams 48 and 52, respectively, to allow the establishment of interference fringes. The detectors 56 and 62 include means for counting the fringe changes.

What I claim is:

1. A method for testing a mechanical-to-electrical transducer comprising the steps of:
    mounting said transducer on a support platform;
    vibrating said platform in accordance with a desired test signal;
    releasing a free-falling body;
    precisely measuring the motion of said platform with reference to said free- falling body; and
    comparing the transducer's output electrical signal, induced by the vibrations of said platform, with the precisely measured motion to obtain an accurate measurement of the transducer's characteristics.

2. The method of claim 1 wherein said motion is measured with laser beams.

3. The method of claim 2 wherein said free falling body is maintained in an evacuated chamber.

4. The method of claim 2 wherein said free falling body is a laser beam generator.

5. The method of claim 1 wherein said support platform is a shaking table.

6. The method of claim 1 wherein,
    said motion is measured by simultaneously measuring a first distance and a second distance,
    said first distance being between a distance-measuring device and said platform, and
    said second distance being between said distance-measuring device and said falling body.

7. The method of claim 1 wherein said motion is measured by measuring the distance between the falling body and said platform.

8. A method of measuring the motion of a transducer comprising the steps of:
    mounting said transducer on a support platform;
    moving said platform in accordance with a desired test signal; and
    precisely measuring the motion of said transducer with reference to a freely-falling body.

9. The method of claim 8, wherein said transducer is a mechanical-to-electrical transducer, and
    measuring the transducer's output electric signal induced by the motion of said platform.

10. The method of claim 9, and comparing said output electric signal with the measured motion of said transducer to obtain an accurate measurement of the transducer's characteristics.

11. An apparatus for measuring the motion of a transducer comprising:
    a support platform for supporting said transducer;
    means moving said platform in accordance with a desired test signal; and
    means measuring the motion of said platform with reference to a freely-falling body.

12. The apparatus of claim 11 wherein said body freely falls within a vacuum chamber.

13. A method of measuring the motion of a transducer comprising the steps of:
    mounting said transducer on a support platform;
    moving said platform in accordance with a desired test signal;
    precisely measuring the relative motion between said transducer and a reference body; and
    isolating said reference body from external vibrations by maintaining said reference body in a state of free fall.

14. The method of claim 13 wherein said reference body is contained within an evacuated enclosure.

* * * * *